United States Patent
Mueller-Niehuus et al.

(10) Patent No.: US 11,796,061 B2
(45) Date of Patent: Oct. 24, 2023

(54) SEALING RING AND USE THEREOF

(71) Applicant: Carl Freudenberg KG, Weinheim (DE)

(72) Inventors: Kristian Mueller-Niehuus, Frankfurt (DE); Andreas Koch, Hamburg (DE); Akio Shimizu, Hamburg (DE)

(73) Assignee: CARL FREUDENBERG KG, Weinheim (DE)

( * ) Notice: Subject to any disclaimer, the term of this patent is extended or adjusted under 35 U.S.C. 154(b) by 45 days.

(21) Appl. No.: 17/534,467

(22) Filed: Nov. 24, 2021

(65) Prior Publication Data

US 2022/0163116 A1 May 26, 2022

(30) Foreign Application Priority Data

Nov. 24, 2020 (DE) .................... 10 2020 131 045.5

(51) Int. Cl.
*F16J 15/3204* (2016.01)

(52) U.S. Cl.
CPC ................... *F16J 15/3204* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212
USPC ....................................................... 277/549
See application file for complete search history.

(56) References Cited

U.S. PATENT DOCUMENTS

| 2,697,623 | A | 12/1954 | Mosher |
| 2,739,584 | A | 3/1956 | Glynn |
| 2,797,944 | A | 7/1957 | Riesing |
| 3,003,835 | A | 10/1961 | Arnold |
| 9,951,870 | B2 | 4/2018 | Mueller-Niehuus |
| 2016/0053894 | A1 | 2/2016 | Mueller-Niehuus |
| 2018/0058585 | A1* | 3/2018 | Sato ..................... F16J 15/3212 |
| 2018/0080562 | A1* | 3/2018 | Mueller-Niehuus ......................... F16J 15/3208 |
| 2021/0270372 | A1 | 9/2021 | Koch |

FOREIGN PATENT DOCUMENTS

| CN | 206234363 U | * 6/2017 |
| DE | 901976 C | 1/1954 |
| DE | 102009053558 A1 | 5/2011 |
| DE | 102016011448 A1 | 3/2018 |
| DE | 102019109273 A1 | 10/2020 |
| EP | 1669647 A1 | 6/2006 |
| EP | 2988035 A1 | 2/2016 |
| EP | 3872373 A1 | 9/2021 |

* cited by examiner

*Primary Examiner* — Nathan Cumar
(74) *Attorney, Agent, or Firm* — LEYDIG, VOIT & MAYER, LTD.

(57) ABSTRACT

A sealing ring is provided for use, e.g., in boring machines or wind turbines, among other intended uses. The sealing ring includes an axial leg and a sealing leg with a sealing lip. The sealing leg is connected to a first end face of the axial leg by means of a joint. The sealing ring further includes a tensioning element for stabilizing the sealing leg in the radial direction. The tensioning element is annular and formed by a spring connected to the sealing leg.

20 Claims, 5 Drawing Sheets

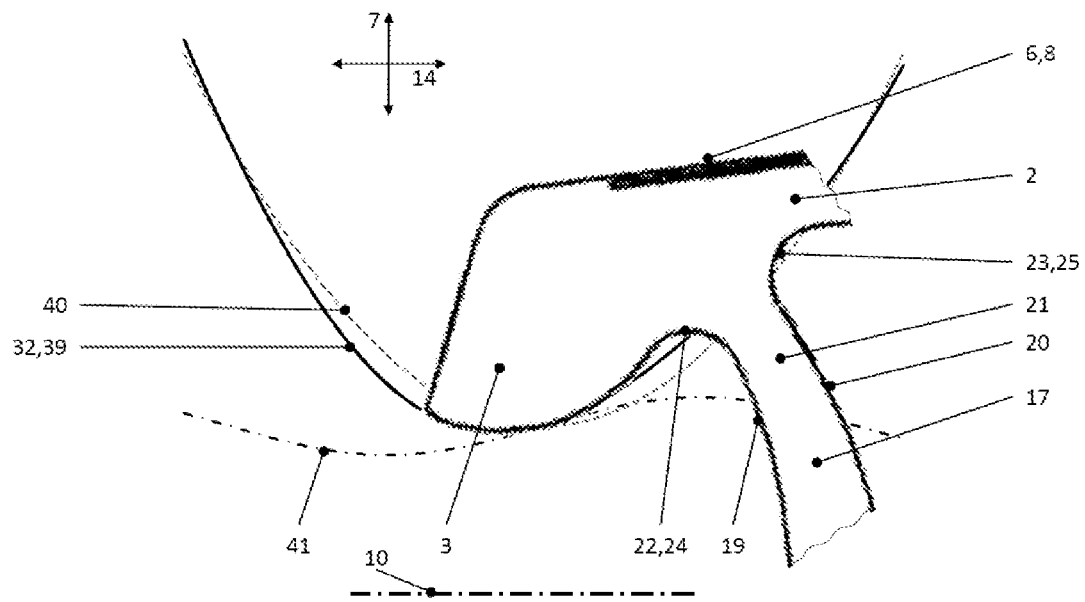

SEALING RING AND USE THEREOF

CROSS-REFERENCE TO PRIOR APPLICATION

Priority is claimed to German Patent Application No. DE 10 2020 131 045.5, filed on Nov. 24, 2020, the entire disclosure of which is hereby incorporated by reference herein.

FIELD

The invention relates to a sealing ring and to the use thereof, the sealing ring, when viewed in cross section, being in the shape of a seven, comprising an axial leg and a sealing leg with a sealing lip, the sealing leg being connected to a first end face of the axial leg by means of a joint, and a tensioning element for stabilizing the sealing leg in the radial direction.

BACKGROUND

EP 2 988 035 A1 discloses a sealing ring that is used for sealing lubricating grease. The sealing ring comprises a tensioning element arranged in an installation groove of the sealing ring. The installation groove is arranged on the side of the sealing leg facing away radially from the sealing lip, wherein the installation groove has an installation opening for the tensioning element on the side facing away radially from the sealing lip, said opening being delimited by two guide webs arranged adjacently at a distance from one another in the axial direction. The joint, when viewed in the radial direction and in the production-related state of the sealing ring, is arranged in the middle of the sealing ring. Also arranged in the radial direction in the middle of the sealing ring in the region of the joint is a substantially C-shaped joint space which is open on one side in the axial direction. This joint space is designed in such a way that therein located medium to be sealed is discharged therefrom. Due to the fact that no medium to be sealed is retained within the joint space, undesired hardening of the sealing ring is prevented, and the sealing leg is able to follow high dynamic deflection movements of a machine element to be sealed without the pressing forces, with which the sealing lip makes sealing contact with the machine element to be sealed, changing appreciably.

A further sealing ring of the type mentioned at the outset is known from DE 10 2009 053 558 A1. The sealing ring is in the shape of a seven and comprises an axial leg, which is comparatively thick in the radial direction, and a sealing leg with a sealing lip, wherein the sealing leg is connected to a first end face of the axial leg by means of a joint. By way of contrast, a separately produced tensioning element for stabilizing the sealing leg in the radial direction is not provided. The joint, when viewed in the radial direction and in the production-related state of the sealing ring, is arranged in the middle of the sealing ring. The two end faces of the axial leg are designed with elevations and supported by means of these elevations in an installation space of a sealing arrangement, wherein the elevations prevent a twisting/tilting of the sealing ring in the installation space during its intended use. The elevations can be designed as circumferentially peripheral self-contained beads, by means of which a particularly good clamping effect of the axial leg in the installation space results.

A further sealing ring and the use thereof are known from DE 10 2016 011 448 A1.

The sealing ring has a tensioning element for stabilizing the sealing leg in the radial direction. The tensioning element is annular and, when viewed in cross section, is formed by a spring in the shape of a seven. The tensioning element has a second axial leg and a stabilizing leg, wherein the second axial leg is connected to the axial leg, and the stabilizing leg is connected to the sealing leg.

The previously known sealing ring has improved performance characteristics during a longer service life, irrespective of the size of the diameter to be sealed. Independently of the installation situation of the sealing ring, the sealing lip always makes sealing contact with a surface to be sealed of a machine element to be sealed with a constant radial prestress during a long service life. By means of the tensioning element, it is irrelevant to the good performance characteristics whether the sealing leg is arranged with its sealing lip radially inside the sealing ring or radially outside the sealing ring.

SUMMARY

In an embodiment, the present invention provides a sealing ring for use, e.g., in boring machines or wind turbines, among other intended uses. The sealing ring includes an axial leg and a sealing leg with a sealing lip. The sealing leg is connected to a first end face of the axial leg by means of a joint. The sealing ring further includes a tensioning element for stabilizing the sealing leg in the radial direction. The tensioning element is annular and formed by a spring connected to the sealing leg.

The object of the embodiments of the present disclosure is to refine a sealing ring of the type mentioned at the outset in such a way that it has improved performance characteristics during a longer service life, substantially independently of the diameter to be sealed, in particular that the sealing lip makes sealing contact with a surface to be sealed of a machine element to be sealed with constant radial prestress during a long service life, independently of the installation situation of the sealing ring.

BRIEF DESCRIPTION OF THE DRAWINGS

The embodiments of the present disclosure will be described in even greater detail below based on the exemplary figures. The embodiments are not limited to the exemplary embodiments. Other features and advantages of various embodiments will become apparent by reading the following detailed description with reference to the attached drawings which illustrate the following:

FIG. 5 shows a detail of the free end of the sealing lip of FIGS. 3 and 4.

DETAILED DESCRIPTION

Figure 1:
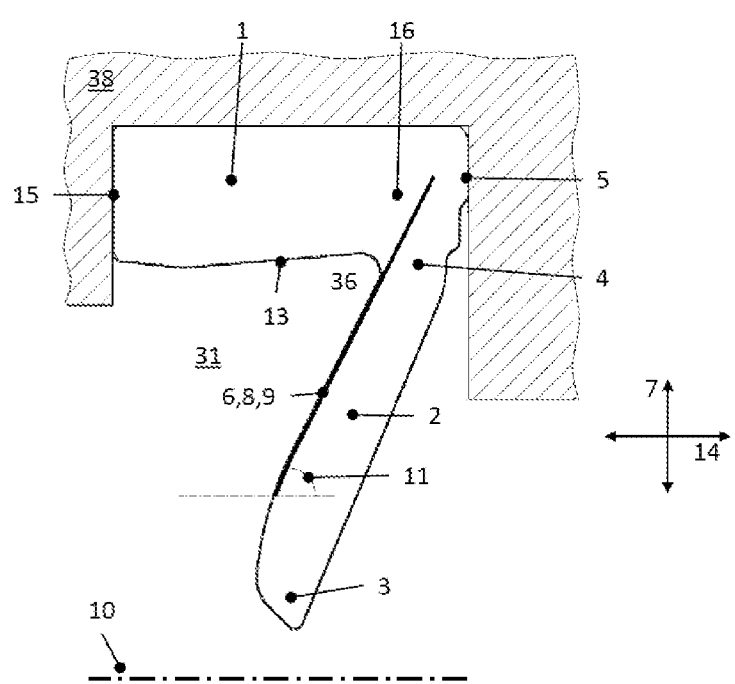
FIG. 1 shows a sealing ring according to an embodiment in its production-related form.

In exemplary embodiments, the sealing ring should be easy and cost-effective to produce.

Moreover, uses should be found for which the sealing ring is particularly suitable.

In an embodiment, a tensioning element of the sealing ring is annular and, when viewed in cross section, is formed by a washer-like spring connected to the sealing leg.

Since the spring is arranged only in the sealing leg, the axial leg can be comparatively thin. As a result, the heat concentration is comparatively low, as is a disadvantageous influence on the pressing force of the sealing lip.

The tensioning element, which has a washer-like shape, brings about the advantageous performance characteristics of the sealing ring irrespective of how the sealing ring is installed. The sealing ring can be used omnidirectionally. The sealing leg with its sealing lip can be arranged radially inside the sealing ring or radially outside the sealing ring or in an axially sealing manner.

In contrast to a spring in the shape of a seven, which corresponds to the shape of the entire sealing ring, a washer-like spring is easier and more cost-effective to produce. Complicated production processes are not necessary for the production of the spring. In addition, it is easier to connect such a spring only to the sealing leg of the sealing ring.

The sealing ring from EP 2 988 035 A1 mentioned at the outset is mainly provided for radially internal sealing systems. The sealing leg and the sealing lip are arranged radially inside the sealing ring, wherein the sealing lip sealingly encloses a surface to be sealed of a machine element to be sealed, for example a shaft, under radial prestress.

For radially external sealing systems, when the axial leg is arranged radially on the inside and the sealing leg with its sealing lip extends radially outward starting from the axial leg, annular helical springs embodied as tensioning elements are disadvantageous. Annular helical springs are currently used as tension springs for internal sealing systems. In external sealing systems, such a spring would have to be designed as a compression spring. This is possible in principle but frequently makes assembly and reliable positioning of the spring in the installation space more difficult. The risk of popping out of the installation space is much higher in comparison with a tension spring.

In the sealing ring according to the invention, however, a washer-like spring is used as the tensioning element. Such a sealing ring has the advantage that it can also be used well in external sealing systems in which the sealing leg with the sealing lip extends radially outward and, for example, makes sealing contact with a wall delimiting a housing bore.

The performance characteristics of the sealing ring according to the invention are consistently good, irrespective of whether the sealing lip is arranged radially inside or radially outside the sealing ring. As a result of the shape of the spring described above, the radial spring force comes from the radial movement of the spring. In this case, it is immaterial to the use whether the system is an external or internal sealing system. The pressing of the sealing lip against a surface to be sealed takes place due to the elastic prestress of the spring against a surface to be sealed of a machine element to be sealed in a sealing arrangement and can thus be implemented independently of the diameter. The performance characteristics of the spring are virtually constant over the entire service life of the sealing ring. The spring is permanently elastic.

Comparatively large radial deflection movements of the machine element to be sealed can be well compensated by the washer-like spring, without appreciably changing the pressing force, with which the sealing lip makes sealing contact under elastic prestress with the surface to be sealed.

Moreover, it is advantageous that the washer-like spring is easier and more cost-effective to produce. It is also possible to integrate such a spring into a sealing ring without problems and in a process-reliable manner.

In the production-related state of the sealing ring, the spring can have a straight extent from radially inside to radially outside. It is advantageous in this case that such a spring is particularly easy and cost-effective to produce. The connection to the sealing leg, which is supported by the spring during the intended use of the sealing ring, is also easy to produce.

The radially outer edge of the spring extends out of the sealing leg into the elastomeric material of the axial leg. The projection of the spring radially outward from the sealing leg into the axial leg is preferably at least 10%, more preferably at least 20%, of the straight extent of the spring. As a result, the spring has, throughout the service life of the sealing ring, a lever effect great enough to press the sealing leg against the surface to be sealed of a machine element to be sealed with a suitable radial pressing force.

It is also advantageous that the spring is additionally fixed in the axial leg and can thereby be better supported in the sealing ring.

The spring can enclose a first angle of 65° to 80° with the axis of symmetry of the sealing ring in its production-related state. This production-related first angle is significantly steeper than during the intended use. This is necessary to achieve a sufficiently high pressing force of the sealing lip of the sealing ring against a surface to be sealed during the intended use of the sealing ring.

During its intended use, the spring can enclose a second angle of 30° to 60° with the axis of symmetry of the sealing ring. During installation of the sealing ring, the spring is elastically deformed from its rather steep first angle following the production of the sealing ring into the aforementioned flatter second angle. As a result, the sealing lip is held under elastic radial prestress on the surface to be sealed of the machine element to be sealed.

According to an advantageous embodiment, it can be provided for the spring to be embedded in the sealing leg. In this case, it is advantageous that the spring forms an integral component of the sealing leg of the sealing ring. An undesirable loss of the spring, both during the mounting of the sealing ring before its use as well as during the intended use in the installed state, can thereby be reliably avoided.

The spring can be at least substantially enclosed by the sealing leg. In this case, it is advantageous that the positioning of the spring in the sealing leg of the sealing ring is particularly reliable and durable. Despite the use of the spring, the sealing ring appears practically integral and the assembly effort of the sealing ring is low as a result. The risk of assembly errors is also kept to a minimum.

According to an advantageous embodiment, the spring is completely enclosed by the sealing material of the sealing leg.

The spring is thereby well protected against external influences.

The performance characteristics of the sealing ring, in particular the pivotability of the sealing leg with the sealing lip around the joint, depends substantially on the performance characteristics of the spring. Even in the case of larger radial deflection movements of a machine element to be sealed in the entire working range of the sealing ring and corresponding pivoting movements of the sealing leg with the sealing lip about the joint, no undesired hardening of the sealing ring occurs as a result of the sealing material, which is arranged at an acute angle between the axial leg and the sealing leg and is undesirably compressed during pivoting movements of the sealing leg about the joint and could thereby disadvantageously change the performance characteristics of the sealing ring.

The spring can consist of a spring steel. In this case, it is advantageous that the spring does not relax even during a long service life of the sealing ring, and as a result, the sealing ring has consistently good performance characteristics during a long service life. Other materials that can be used for the spring can be, for example, polymeric materials that have sufficiently good elastic performance characteristics during a long service life.

The axial leg and the sealing leg, more preferably the axial leg, the sealing leg and the joint, can merge integrally into one another and be formed from the same material and consist of a sealing material. The sealing ring is easy and cost-effective to produce thanks to the simple construction with few parts. The sealing material can be an elastomer or a polyurethane, the sealing material preferably having a Shore A hardness of 60 to 98. Such materials achieve a good sealing effect during a long service life.

According to an advantageous embodiment, it can be provided for the axial leg to have an undercut on its side radially facing the sealing leg, said undercut extending in the axial direction from a second end face of the axial leg toward the first end face and the joint. In general, it has proven advantageous with regard to the performance characteristics, in particular with regard to the performance characteristics of the sealing ring in radially external sealing systems, if the joint between the axial leg and the sealing leg is arranged as far away as possible from the sealing lip in the radial direction. As a result, the sealing leg can follow radial deflection movements of a machine element to be sealed particularly well, even if these deflection movements in the radial direction are comparatively large. The magnitude of the radial deflection movements is dependent on the diameter to be sealed. The diameters to be sealed in wind turbines can be 4 m, for example, and the diameters to be sealed in tunnel boring machines can be, for example, 18 m.

Due to the arrangement of the joint as far away as possible from the sealing lip in the radial direction and the resulting good elastic flexibility of the sealing leg in the entire working range of the sealing ring, even in such a case, the sealing lip makes contact with the surface to be sealed with a consistently good radial contact pressure and thereby sealing effect over the entire circumference.

The advantageous performance characteristics of the sealing ring described above are favored in that the joint, when viewed in the radial direction and in the production-related state of the sealing ring, is arranged in the third of the sealing ring furthest away from the sealing lip.

In the case of sealing rings in which the joint, when viewed in the radial direction and in the production-related state of the sealing ring, is arranged approximately in the middle of the sealing ring, the compensating capability at high eccentricities and large diameters to be sealed is significantly lower in comparison to the above-described embodiment.

As already described above, the sealing lip can be arranged on the inside or outside of the sealing ring in the radial direction. Surprisingly, it has been found that the sealing ring has consistently good performance characteristics regardless of whether the sealing lip is arranged radially inside or radially outside the sealing ring. Radially outwardly arranged surfaces to be sealed can be sealed by the sealing ring with the same reliability as radially inwardly arranged surfaces to be sealed.

According to an advantageous embodiment, it can be provided for the sealing leg to have, on its side axially facing the first end face, a dirt lip with at least one sealing edge and a radially internal first boundary surface and a radially external second boundary surface.

By providing a dirt lip on the side of the sealing lip facing the environment of the sealing ring, the sealing lip is effectively protected from being subjected to contaminants. Especially when the sealing ring is used in a highly contaminated environment, the dirt lip which is connected upstream of the sealing lip in the direction of the environment in a functional series connection is of notable advantage. The contaminants are prevented by the dirt lip from penetrating up to the sealing lip. As a result, the sealing lip protected by the dirt lip functions consistently well during a long service life.

The dirt lip can be hinged to the sealing leg by means of a second joint. This has the advantage that the sealing leg and the dirt lip are functionally coupled. If the sealing leg moves in the radial direction outward or inward within its working range during the intended use of the sealing ring, the dirt lip follows in a corresponding manner because it is hinged to the sealing leg by means of the second joint.

As a result of the hinging of the dirt lip to the sealing leg, the dirt lip automatically follows the sealing leg over its entire radial working range without adversely affecting the function of the sealing lip on the sealing leg.

The second joint may have a radially internal joint radius and a radially external joint radius through which the dirt lip is designed to merge into the sealing leg.

The internal and external joint radii may substantially be the same. The ratio of internal joint radius to external joint radius would then be approximately 1.

Due to the design of the joint radii, their individual function can be adapted independently of one another to the respective application. The radially internal joint radius predominantly influences the contact force with which the dirt lip abuttingly encloses the machine element to be sealed during the intended use of the sealing ring. By way of contrast, the radially external joint radius influences the flexibility of the dirt lip in the radial direction.

In the production-related state of the sealing ring, the sealing leg and the dirt lip can delimit a substantially right angle radially internally and radially externally. Such a design achieves a good compromise of a good sealing effect of the dirt seal on the one hand and an operation of the dirt lip on the machine element to be sealed with the lowest possible frictional losses on the other hand.

This is facilitated if, when viewed in the production-related state of the sealing ring in each case, the sealing lip has a first diameter and the sealing edge a second diameter, wherein the first diameter is smaller than the second diameter. During the intended use of the sealing ring, i.e., in its installed state in a sealing arrangement, the sealing lip encloses the machine element to be sealed with a comparatively greater radial prestress than the sealing edge.

The advantageous performance characteristics described above can be further facilitated in that the first boundary surface delimiting the right angle radially inside the dirt lip has a first length and a third boundary surface of the sealing leg has a third length deviating from the first length, wherein the first length is greater than the third length.

The sealing leg and the dirt lip are preferably formed such that they merge with each other in one piece and of one material and consist of a rubber-elastic sealing material. In this case, it is advantageous that the sealing ring has a simple construction with a small number of parts and is thus easy and cost-effective to produce. Moreover, assembly is particularly easy as a result of the one-piece design; the risk of assembly-related errors during installation of the sealing ring is thereby kept to a minimum.

According to an advantageous embodiment, it can be provided that the second boundary surface is convexly formed along its extent. The convex geometry of the second boundary surface of the dirt lip is required in order to achieve a defined line contact of the sealing edge of the dirt lip. The radius of curvature of the convex boundary surface is selected such that surface contact of the dirt lip on a component to be sealed during the intended use of the sealing ring and associated diminished performance characteristics are reliably avoided.

The spring is arranged on the side of the sealing leg facing away axially from the dirt lip in order to stabilize the sealing leg in the radial direction.

According to an advantageous embodiment, it can be provided for the sealing lip, when viewed in section, to be substantially formed by a parabola on its side facing away axially from a space to be sealed in such a way that the parabola and a surface to be sealed delimit a substantially constant sealing angle over the entire radial working range of the sealing lip. Due to the parabolic shape, the sealing lip is also particularly well-suited to sealing oily media. Oily media can also be reliably sealed with negligibly low leakage.

In particular sealing rings with large diameters, such as sealing rings for tunnel boring machines or wind turbines, must also be able to compensate well for large radial deflection movements of machine elements to be sealed against one another and continue to seal well. This cannot be achieved with a practically sharp-edged sealing lip, such as is used, for example, in radial shaft sealing rings.

Radial shaft sealing rings are provided for sealing oil-containing media and are based on a hydrodynamic concept of two different mutually opposing angles. A comparatively steeper angle to the oil side, which encloses an angle of 40° to 50° with an axis of symmetry of the radial shaft sealing ring, and a comparatively flatter angle to the environment side, which encloses an angle of 20 to 30° with the axis of symmetry. The angles are in a fixed relationship to one another, which is maintained even if the position of the machine element to be sealed against one another changes in the radial direction. It follows therefrom, however, that the angles to the machine element to be sealed change undesirably in such a case. Radial shaft sealing rings are less well-suited for large deflection movements and good functioning in a large radial working range of the sealing ring.

Due to the sealing leg, which is inclined during intended use to greatly differing extents with respect to the axis of symmetry of the sealing ring, the sealing effect of the sealing ring would be limited and undesired leakage would occur.

Due to the parabolic shape of the sealing leg on its side facing a machine element to be sealed, a constant sealing angle and thus a consistently good sealing result over the entire radial working range of the sealing lip, which the latter has during the intended use of the sealing ring, are achieved by means of the sealing leg and the machine element to be sealed.

The approximate parabola can be described by the following function:

$$f(x)=a1*x^2+a2*\sin(f1*x)$$

a1: first compression factor
a2: second compression factor
f1: frequency
X: axial direction The sealing lip runs substantially parabolically but is significantly asymmetrical. Both contours of the sealing lip in the axial direction, the one toward the space to be sealed and the one toward the environment side, are each curved convexly. However, both convex profiles deviate from the classic parabolic shape. This is done by including a sine term in the parabolic shape.

Starting from the point x axis=0, the parabola and the sine run in opposite directions in their radial y values in the negative axial x direction (toward the space to be sealed). This initially flattens the parabola. As soon as the sine has reached its low point, it augments the parabolic course, and the resulting function values increase more steeply.

In contrast, in the positive x direction, the sine initially rises faster than the parabola and dominates the contour. As soon as the sine has reached its maximum and falls, the sine has a damping effect on the then dominating parabola.

Given a suitable choice of the coefficients of parabola a1 and a2, f1 sine, a contour is formed which has a constant positive slope around x=0, while a steep convex contour adjoins in the negative direction and while a flatter convex contour adjoins in the positive x direction.

Surprisingly, with a suitable selection of the respective coefficients, it is achieved that the constant slope forms a classic flat angle toward the environment side when the machine element to be sealed is installed according to its use and is deflected to a small extent in relation to the sealing ring. As soon as the deflections become larger, the increasingly steeper contour counteracts a further flattening. It is thus achieved that a defined sealing surface is maintained. Friction and heat input are minimized.

The minimum of the function corresponds to the classic sealing edge when installed according to use and in the zero position of the seal.

In contrast, the course of the contour of the sealing lip toward the medium to be sealed is designed in such a way that a steep angle arises during intended use. In the zero position, the classic angle of the side toward the medium to be sealed is present. In the case of upward deflection (compression of the sealing lip), the angle would become steeper. However, because the convex contour described above unwinds in the positive x direction, an increasingly flatter contour is brought to bear. The flattening contour counteracts the deflection-induced steep position. With negative radial deflection, the situation is exactly the reverse. The angle becoming increasingly flatter toward the medium to be sealed, for example toward the oil side, is compensated by the contour becoming increasingly steeper. The classic steep position is thereby maintained to the greatest extent possible.

The sealing ring described above can be used in tunnel boring machines, wind turbines or other radial applications.

Figure 2:
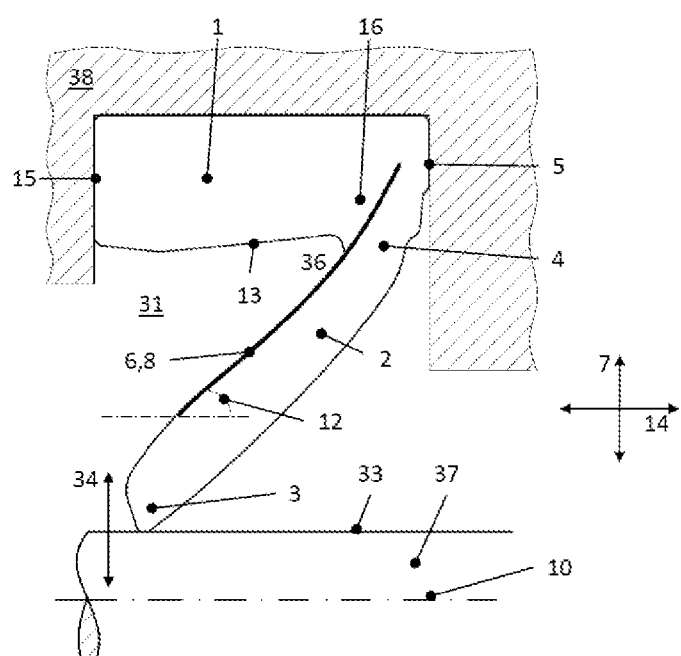
FIG. 2 shows the exemplary embodiment of the sealing ring of FIG. 1, wherein the sealing ring is shown in a sealing arrangement during its intended use.

FIGS. 1 and 2 show a sealing ring according to a first exemplary embodiment. The sealing ring is in the shape of a seven and has, as a tensioning element 6, a spring 8 which forms an integral component of the sealing ring and is completely enclosed by the sealing material of the sealing ring.

The spring 8 is annular and, when viewed in cross section, washer-like.

The sealing ring comprises the axial leg 1 and the sealing leg 2 with the sealing lip 3, wherein, depending on the application, the sealing leg 2 and the sealing lip 3 are arranged radially inside or radially outside the sealing ring. The sealing ring can be used omnidirectionally.

The sealing leg 2 is hinged to the first end face 5 of the axial leg 1 by means of the joint 4, wherein the joint 4 is arranged as far as possible from the sealing lip 3 in the radial direction 7 in order to be able to compensate for even large eccentricities of a machine element 37. These large eccentricities occur mainly when the diameter to be sealed is large, for example, approximately 2 m or more. The working range of the sealing ring is denoted by reference sign 34.

The joint 4 merges integrally into one another and is formed from the same material as the axial leg 1 and the sealing leg 2. When viewed in the radial direction 7 and in the production-related state of the sealing ring, the joint 4 is arranged in the third 16 of the sealing ring furthest away from the sealing lip 3. In order to further improve the pivotability in the working range 34 of the sealing leg 2 relative to the axial leg 1 about the joint 4, it is provided for the axial leg 1 to have, on its side radially facing the sealing leg 2, the undercut 13, which extends in the axial direction 14 from the second end face 15 of the axial leg 1 to the first end face 5 and to the joint 4.

In the first exemplary embodiment, the side of the sealing lip 3 axially facing away from the space 31 to be sealed is substantially sharp-edged.

Such a sealing lip 3 is particularly well-suited to sealing grease.

The joint space 36 is delimited by the mutually facing sides of the axial leg 1 and the sealing leg 2. The spring 8 is arranged substantially directly below the surface of the sealing leg 2. The spring 8 extends substantially in parallel to the sealing leg 2. The spring 8 ensures that the sealing leg 2 and thus the sealing lip 3 are assigned to a machine element to be sealed in the circumferential direction during a long service life with a consistent contact pressure, wherein the sealing lip 3 makes sealing contact with a surface of a machine element to be sealed.

The spring 8 projects radially outward into the axial leg 1. Eccentricities of the machine elements 37, 38 to be sealed against one another are well compensated in the entire working range 34 by the washer-like spring 8. The sealing leg makes contact with the machine element 37 to be sealed with substantially the same radial prestress in the entire working range.

The first machine element 37 to be sealed is assigned to a second machine element 38 to be sealed at a radial distance.

The spring 8 extends in a straight line from radially inside to radially outside. Such a spring 8 is particularly easy and cost-effective to produce. The connection to the sealing leg 2, which is supported by the spring 8 during the intended use of the sealing ring, is also easy to produce.

In the exemplary embodiment shown, the radially outer edge of the spring 8 extends out of the sealing leg into the elastomeric material of the axial leg 1. 10% of the radial length of the spring 8 are enclosed by the elastomeric material of the axial leg 1.

If the sealing leg 2 is elastically deformed from its production-related form, shown in FIG. 1, to its form during the intended use, shown in FIG. 2, the spring 8 holds the sealing leg 2 against the surface to be sealed of the machine element 37 to be sealed with a suitable radial pressing force by means of a lever action.

In the production-related state, the spring 8 encloses a first angle 11 with the circumferential axis of symmetry 10 of the sealing ring, said angle being approximately 75° in the exemplary embodiment shown.

During the intended use, however, the second angle 12 is approximately 45° in the exemplary embodiment shown.

The machine element 37, 38 to be sealed can be formed in a radially internally sealing manner by a shaft to be sealed or in a radially externally sealing manner by a wall to be sealed and delimiting a housing bore.

The performance characteristics of the sealing ring according to the invention are consistently good, irrespective of whether the sealing lip 3 is arranged radially inside or radially outside the sealing ring. The sealing lip 3 is pressed against a surface to be sealed by the elastic bending of the spring 8 and is thus independent of diameter.

Figure 3:
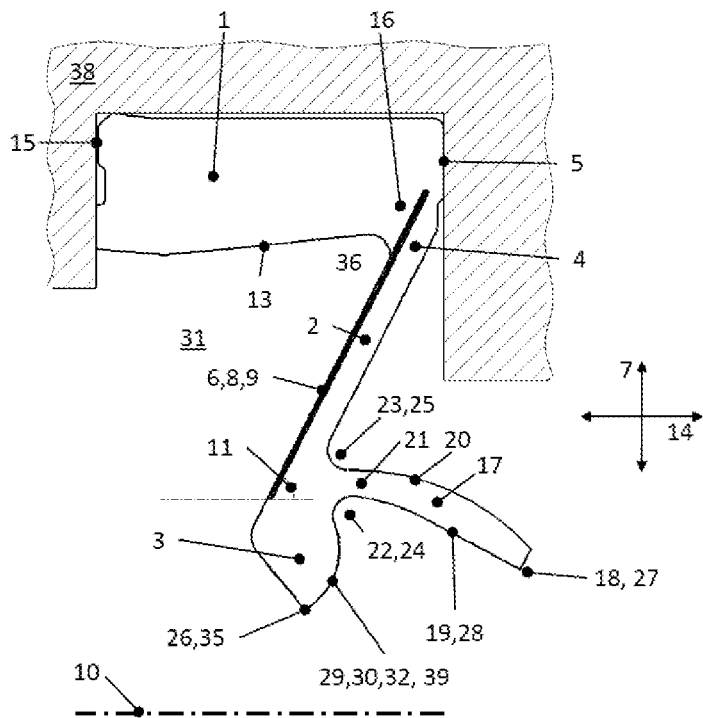
FIG. 3 shows a sealing ring according to an embodiment in its production-related form, with a dirt lip assigned adjacently to the sealing leg.
Figure 4:
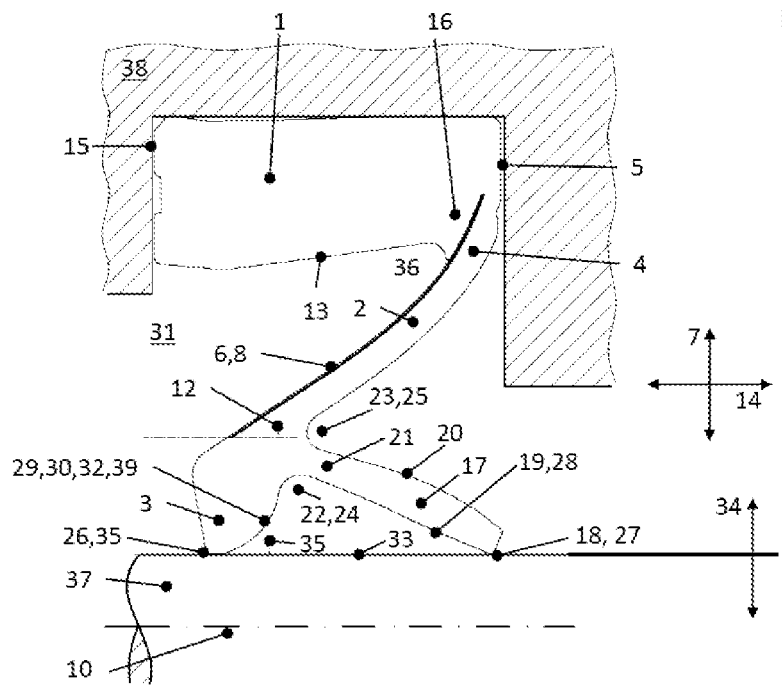
FIG. 4 shows the exemplary embodiment of the sealing ring of FIG. 3, wherein the sealing ring is shown in a sealing arrangement during its intended use.

FIGS. 3 to 4 show a sealing ring according to a second exemplary embodiment. When viewed in cross section, the sealing ring is in the shape of a seven and comprises the axial leg 1 and the sealing leg 2 with the sealing lip 3. The sealing leg 2 is hinged to the first end face 5 of the axial leg 1 by means of the joint 4.

On the side of the sealing leg 2 axially facing the first end face 5, the dirt lip 17 comprising the sealing edge 18 is arranged in the radially internal region of the sealing leg 2. The dirt lip 17 has the first boundary surface 19 radially on the inside and the second boundary surface 20 radially on the outside. The first boundary surface 19 is substantially flat, whereas the second boundary surface 20 is convex.

The sealing leg 2 and the dirt lip 17 merge integrally into one another and are formed from the same material, consist of a rubber-elastic material and are elastically resiliently connected to one another by means of the second joint 21. The second joint 21 is formed by a radially internal joint radius 22 and a radially external joint radius 23, which are substantially the same in the example shown.

In FIG. 3, the sealing ring is shown in its production-related state, that is to say is not installed in a sealing arrangement as shown in FIG. 4. As shown here, the dirt lip 17 projects substantially perpendicularly from the sealing leg 2, wherein the first diameter 26 of the sealing lip 3 is smaller than the second diameter 27 of the sealing edge 18. The sealing leg 2 and the dirt lip 17 delimit the substantially right angles 24, 25.

The first boundary surface 19 delimiting the right angle 24 radially inside the dirt lip 17 has the first length 28. The third boundary surface 29 of the sealing leg 2 has the third length 30, which is different from the first length 28. The first length 28 is greater than the third length 30. The geometry of the dirt lip 17, the geometry of the sealing leg 2 radially inside the second joint 21 and the hinging of the dirt lip 17 to the sealing leg 2 ensure that the dirt lip 17 forms an integral component of the sealing ring and moves with the sealing leg 2 jointly in the radial direction in the working range. The sealing lip 3 of the sealing leg 2 is protected by the dirt lip 17 from being subjected to contaminants from the environment of the sealing ring during the intended use of the sealing ring. The dirt lip 17 functions over the entire working range 34 of the sealing ring without adversely affecting the function of the sealing lip 3.

The tensioning element 6 is arranged on the side of the sealing leg 2 facing away axially from the dirt lip 17. The tensioning element 6 is provided for stabilizing the sealing leg 2 in the radial direction. The tensioning element 6 is formed by the spring 8 which, in the exemplary embodiment shown here, consists of a permanently elastic spring steel.

In the second exemplary embodiment, the side of the sealing lip 3 axially facing away from the space 31 to be sealed is formed by a parabola 32. The parabola 32 makes contact with the surface 33 to be sealed of the machine element 37 to be sealed over the entire radial working range 34 of the sealing lip 3 with a substantially constant sealing angle 35.

Such a substantially parabolic geometry is particularly well-suited to sealing low-viscosity media, such as oil.

Due to the good performance characteristics during a long service life, even if the sealing ring is radially externally sealing, the sealing ring according to the invention is particularly well-suited to use in tunnel boring machines or wind turbines.

In FIG. 5, the free end of the sealing lip 3 of FIGS. 3 and 4 is shown as a detail.

The sealing edge geometry 39 substantially follows the geometry of a parabola 40. The sealing edge geometry 39 follows the function:

$$f(x)=a1*x^2+a2*\sin(f1*x)$$

The sine has reference sign 41.

While the embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the embodiments refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sealing ring, comprising an axial leg and a sealing leg with a sealing lip, the sealing leg being connected to a first end face of the axial leg by means of a joint, and a tensioning element for stabilizing the sealing leg in the radial direction,
    wherein the tensioning element is annular and is formed by a spring connected to the sealing leg,
    wherein the sealing leg has, on a side axially facing the first end face, a dirt lip with at least one sealing edge and a radially internal first boundary surface and a radially external second boundary surface,
    wherein, in a production-related state of the sealing ring, the sealing lip has a first diameter, and the sealing edge has a second diameter, and wherein the first diameter is smaller than the second diameter, and
    wherein the first boundary surface delimiting a right angle radially inside the dirt lip has a first length, and a third boundary surface of the sealing lip has a third length deviating from the first length, and wherein the first length is greater than the third length.

2. The sealing ring according to claim 1, wherein the spring encloses a first angle of 65° to 80° with an axis of symmetry of the sealing ring in the production-related state.

3. The sealing ring according to claim 2, wherein the spring encloses a second angle of 30° to 60° with the axis of symmetry of the sealing ring in use.

4. The sealing ring according to claim 1, wherein the spring is embedded in the sealing leg.

5. The sealing ring according to claim 4, wherein the spring is at least substantially enclosed by the sealing leg.

6. The sealing ring according to claim 5, wherein the spring consists of a spring steel.

7. The sealing ring according to claim 1, wherein the axial leg and the sealing leg merge integrally into one another and are formed from a sealing material.

8. The sealing ring according to claim 1, wherein the axial leg, the sealing leg and the joint merge integrally into one another and are formed from a sealing material.

9. The sealing ring according to claim 1, wherein the axial leg has an undercut on a side radially facing the sealing leg, the undercut extending in the axial direction from a second end face of the axial leg toward the first end face and the joint.

10. The sealing ring according to claim 1, wherein the joint, when viewed in the radial direction and in the production-related state of the sealing ring, is arranged in a third of the sealing ring furthest away from the sealing lip.

11. The sealing ring according to claim 1, wherein the sealing lip is arranged on an inside or an outside of the sealing ring in the radial direction.

12. The sealing ring according to claim 1, wherein the dirt lip is hinged to the sealing leg by means of a second joint.

13. The sealing ring according to claim 12, wherein the second joint has a radially internal joint radius and a radially external joint radius, through which the dirt lip merges into the sealing leg.

14. The sealing ring according to claim 1, wherein the sealing leg and the dirt lip, in the production-related state of the sealing ring, delimit a substantially right angle radially internally and radially externally.

15. The sealing ring according to claim 1, wherein the sealing leg and the dirt lip merge integrally into one another and are formed from a rubber-elastic sealing material.

16. The sealing ring according to claim 1, characterized in that the second boundary surface is convex along an extent of the second boundary surface.

17. The sealing ring according to claim 1, wherein, merging from the sealing leg into the axial leg, the spring is arranged on a side of the sealing leg facing away axially from the dirt lip.

18. The sealing ring according to claim 1, wherein the sealing lip, when viewed in section, is substantially formed by a parabola on a side facing away axially from a space to be sealed in such a way that the parabola and a surface to be sealed delimit a substantially constant sealing angle over a radial working range of the sealing lip.

19. The sealing ring according to claim 1, wherein the sealingring is included in a tunnel boring machine or a wind turbine.

20. A sealing ring, comprising an axial leg and a sealing leg with a sealing lip, the sealing leg being connected to a first end face of the axial leg by means of a joint, and a tensioning element for stabilizing the sealing leg in the radial direction, wherein the tensioning element is annular and is formed by a spring connected to the sealing leg, and wherein, in a production-related state of the sealing ring, the entire spring has a straight extent from radially inside to radially outside.

\* \* \* \* \*